(12) United States Patent
Saha et al.

(10) Patent No.: US 7,783,742 B2
(45) Date of Patent: Aug. 24, 2010

(54) DYNAMIC PROCESS RECOVERY IN A DISTRIBUTED ENVIRONMENT

(75) Inventors: Sanjib Saha, Bothell, WA (US);
Sumitra Sujanani, Redmond, WA (US);
Lee B. Graber, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1047 days.

(21) Appl. No.: 11/143,536

(22) Filed: Jun. 2, 2005

(65) Prior Publication Data
US 2006/0277538 A1  Dec. 7, 2006

(51) Int. Cl.
*G06F 15/173* (2006.01)
*G06F 15/16* (2006.01)

(52) U.S. Cl. ............... 709/224; 709/223; 709/227; 709/228

(58) Field of Classification Search .......... 709/223
See application file for complete search history.

(56) References Cited

U.S. PATENT DOCUMENTS

| 6,654,801 B2 * | 11/2003 | Mann et al. ............. 709/224 |
| 2002/0059306 A1 * | 5/2002 | Leymann et al. ......... 707/200 |
| 2003/0084278 A1 * | 5/2003 | Cromer et al. ........... 713/2 |
| 2005/0021759 A1 * | 1/2005 | Gupta et al. ............ 709/226 |

* cited by examiner

*Primary Examiner*—Philip C Lee
*Assistant Examiner*—Angela Nguyen
(74) *Attorney, Agent, or Firm*—Woodcock Washburn LLP

(57) ABSTRACT

Methods for providing dynamic process recovery that supports recovery of event driven services. The present invention addresses situations where a service-hosting process fails as well as all of the services which were running in that process. To recover from this scenario, the present invention restarts the services from a last known good state. The present invention also provides for situations where a process is shut down in a controlled manner, but the services running within it are still able to drive. Here again, the services are restarted in a secondary process. The recovery modal described here, therefore, advantageously addresses a problem in the design of a distributed event-driven environment.

14 Claims, 4 Drawing Sheets

DYNAMIC PROCESS RECOVERY IN A DISTRIBUTED ENVIRONMENT

FIELD OF THE INVENTION

This invention relates in general to the field of computer system recovery. More particularly, this invention relates to a system and method of recovering processes and their services at a last known good state after a failure.

BACKGROUND OF THE INVENTION

Conventional fault tolerance for processes typically use some type of heart beat communication between two servers. In this manner if a first process fails on a first server (or if the entire first server fails), a second server will recognize that the heartbeat from the first server has stopped. The second server will then start up another instance of the process. However, for recovery of event-driven services, which run within the server process, the heartbeat mechanism alone is not sufficient. For example, modeling a process as a shell, the real logic are the individual threads of execution, i.e., services, which run within the shell. Thus, it is important to insure that when this failover occurs, not only is the process recovered, but also all services hosted in the failed process are restarted from a last known good state. The conventional heartbeat mechanism is necessary to detect the failure of the process and enabling another eligible process on a different server to execute the service, but it is unable to automatically restart the services of the failed process in the new server from the last known good state.

Therefore, there is a need for addressing not only the restart of the actual process shell, but all of the services which were running in that process shell in a different server. This is also true of instances where a process is shut down in a controlled manner, but the services running in the process are still driving and need to be restarted in a second server. The present invention provides solutions to these and other limitations in the prior art.

SUMMARY OF THE INVENTION

Methods for providing dynamic process recovery that supports recovery of event driven services. The present invention addresses situations where a process fails as well as all of the services which were running in that process. To recover from this scenario, the present invention restarts the services in a different process from a last know good state. The present invention also provides for situations where a process is shut down in a controlled manner, but the services running within it are still able to drive. Here again, the services are restarted in a secondary process. The recovery modal described here, therefore, advantageously addresses a problem in the design of a distributed event-driven environment.

In accordance with an aspect of the invention, there is provided a method of process recovery in a distributed environment. The method includes detecting a process heartbeat associated with a first instance of a process, the process having services, determining that the process has failed if the heartbeat was not received at a predetermined next heartbeat time, releasing resources associated with the process, and restarting a second instance of the process and the services from a last known good state of the first instance of the process.

The method may also include storing information regarding the process heartbeat in a database table and scheduling a database agent job to check a current time against the next heartbeat time. The services may be restarted in a second instance of the process if messages (events) are marked for the services. If there are no messages marked for the service, a restart message is provided to restart the service within the second instance of the service hosting process.

In addition, the method may determine if the service has resources which are not persistent or if the service does not need to be recovered. If so, all information associated with the service are deleted and the service is not restarted in the second instance of the process.

The present invention may also ascertain if a service was incorrectly determined as failed by comparing an identifier associated with the first instance of the service with an identifier in a database table.

Also, the present invention may determine if the first instance of the process is being shutdown in a controlled manner and if the services running in the process are active. The process may be removed from memory. The invention may determine if the services will be able to restart, and if not, provide a restart message to the services to restart it in a second instance of the process.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
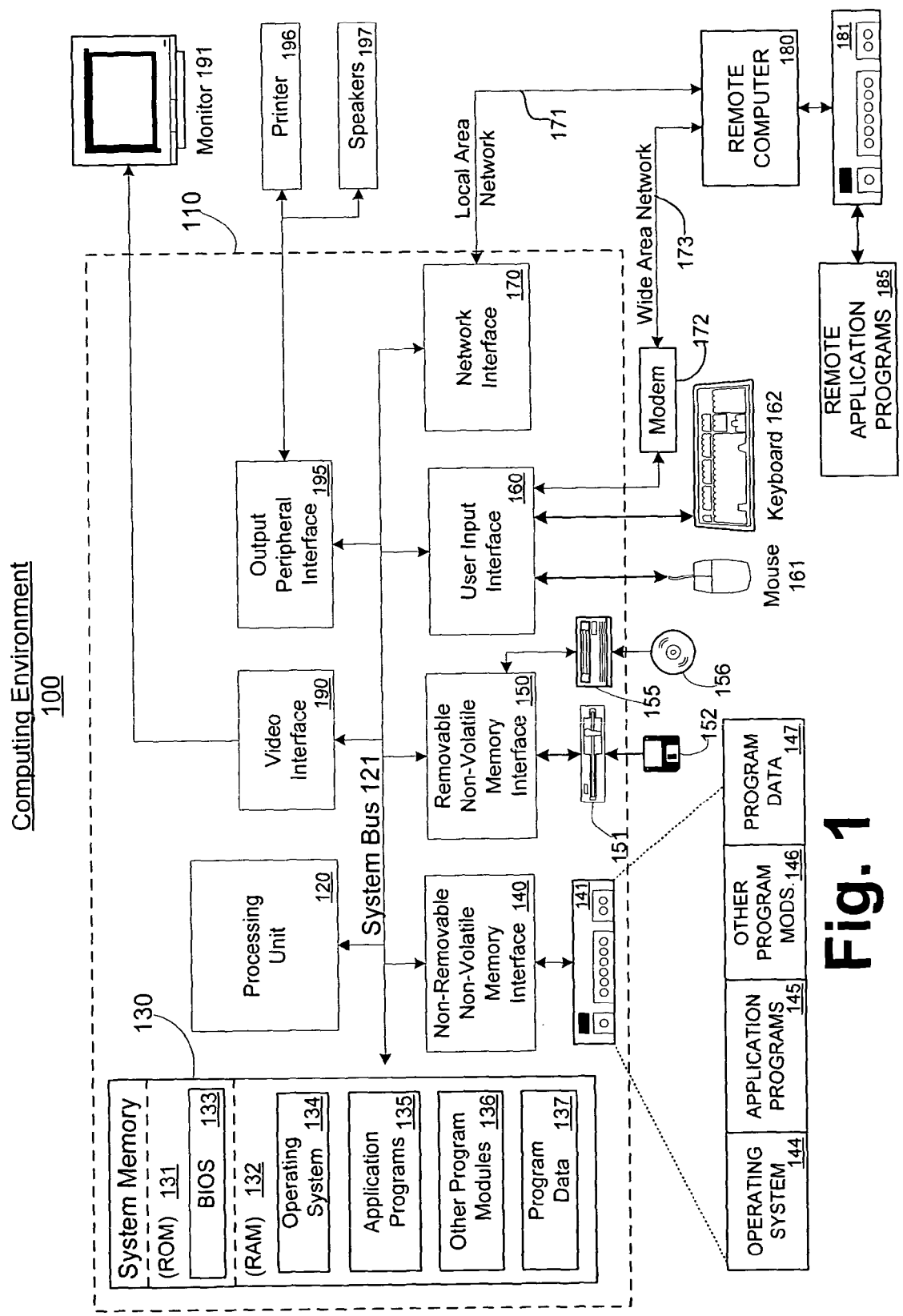
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiment of Process Recovery in a Distributed Environment

The dynamic process recovery model of the present supports recovery of event driven services. The present invention addresses situations where a service hosting process fails, and hence all services which were running in that process need to be restarted in a different process, as well as when a process is shut down in a controlled manner but the services running within it are still able to drive and need to be restarted in a secondary process. The recovery modal described here, therefore, advantageously addresses a problem in the design of a distributed event-driven environment.

Business processes are triggered by the receipt of an event (message) and long lived, stateful processes often receive many correlated events during the lifetime of the business process. In many large deployments, fault tolerance for these business processes is a requirement. The recovery model described here is a part of the MessageBox infrastructure which is, among other things, the eventing sub-system for BIZTALK Server 2004.

As used herein, the following terms have the following definitions:

Process: A process as understood by the underlying operating system. Common processes on personal computers running MICROSOFT WINDOWS are World Wide Web Publishing Service, MICROSOFT SQL Server, anti-virus processes, etc. MICROSOFT BIZTALK Server 2004 has its own process, which is contained within btsntsvc.exe.

Business process: A business transaction that requests information from or changes the data in a database, or a specific event in a chain of structured business activities. The event typically changes the state of data and/or a product and generates some type of output. Examples of business processes include receiving orders, invoicing, shipping products, updating employee information, or setting a marketing budget.

Service or service: Represents a logical thread running within the process that is actually executing the business process.

Event driven services: These services are triggered by the occurrence of an event or message, such as a purchase order handling process triggered by a purchase order. When the event occurs, it is delivered to the process as a message and the service is started within the process to handle this event. For long running services, points can be reached where the service will block while waiting for a correlated event. At these points the service can acquiesce (i.e., dehydrate) and wait to be restarted by an eventing layer when the correlated event occurs. An example of this with respect to a purchase order handling process would be if the service, based on some rule, sent a message (event) back to the customer informing him of a price change and requesting confirmation of the order with the new price.

Last known good state: During the execution of a business process or service, points are reached where the service will wish to store data so that if a serious failure occurs, the service can restart from this point. An example in the context of a purchase order handling process is when the message is sent to the customer about a price change. If a failure were to occur, this message should not be resent, but instead the service should continue blocking waiting for the response. The last known good state is stored in the persisted data written out by the business process.

Active services: The underlying eventing subsystem needs to be able to store the knowledge of what services are actually running within the process so that when a failure occurs and is detected, the eventing subsystem can recover those services. Services that are currently in memory and executing in the process are known as active services. This is contrasted to dehydrated services, which are services that are blocked waiting for an event to occur. A dehydrated service will be resumed by the eventing subsystem upon receipt of an event marked for delivery to the said dehydrated service.

Process failure recovery: This is where the actual process has failed in a non-controlled fashion. This can occur if the hardware on which the process is running fails (e.g., someone unplugs the machine) or if a malicious process causes the process to crash. In this case, the eventing subsystem, perhaps using a classic heartbeat mechanism, detects that the process is down and takes steps to recover the services which were running within that process. A control message may be routed to each business process service that needs to be recovered. The control message may be delivered to any formerly live process service which requires recovery. This will then result in the last known good state of the process service to be read from a store and the business process will be restarted from this point.

Controlled shutdown recovery: This is a case where users force the shutdown of a process. The business processes that were running dehydrate even though they may not have any pending messages for which they are waiting. In this case, the state store (e.g., the MessageBox in MICROSOFT BIZTALK Server) allows the service to indicate that when they dehydrate they are not blocking and should be immediately restarted on an available process. In this case, a restart control message (discussed below) is routed to the service when it dehydrates to ensure that it will be restarted in the next available process.

The present invention provides for failure detection, freeing of data and restarting of previously active services, and handling of incorrect failure detection in a scalable, fault-tolerant environment having multiple service instances that may be running on one or more computers. In a first aspect, in order to accurately determine when to handle a process failure, it must first be detected. A process failure is described as an error that prevents the process from processing any new messages and blocks it from completing the processing of messages on which it was actively working. The most common failure is a system crash, when either the process or the entire physical machine goes down. It also noted that the present invention protects against cases when a process is incorrectly diagnosed as down, such as when the debugger is attached and the process has stopped, but has not actually failed.

Figure 2:
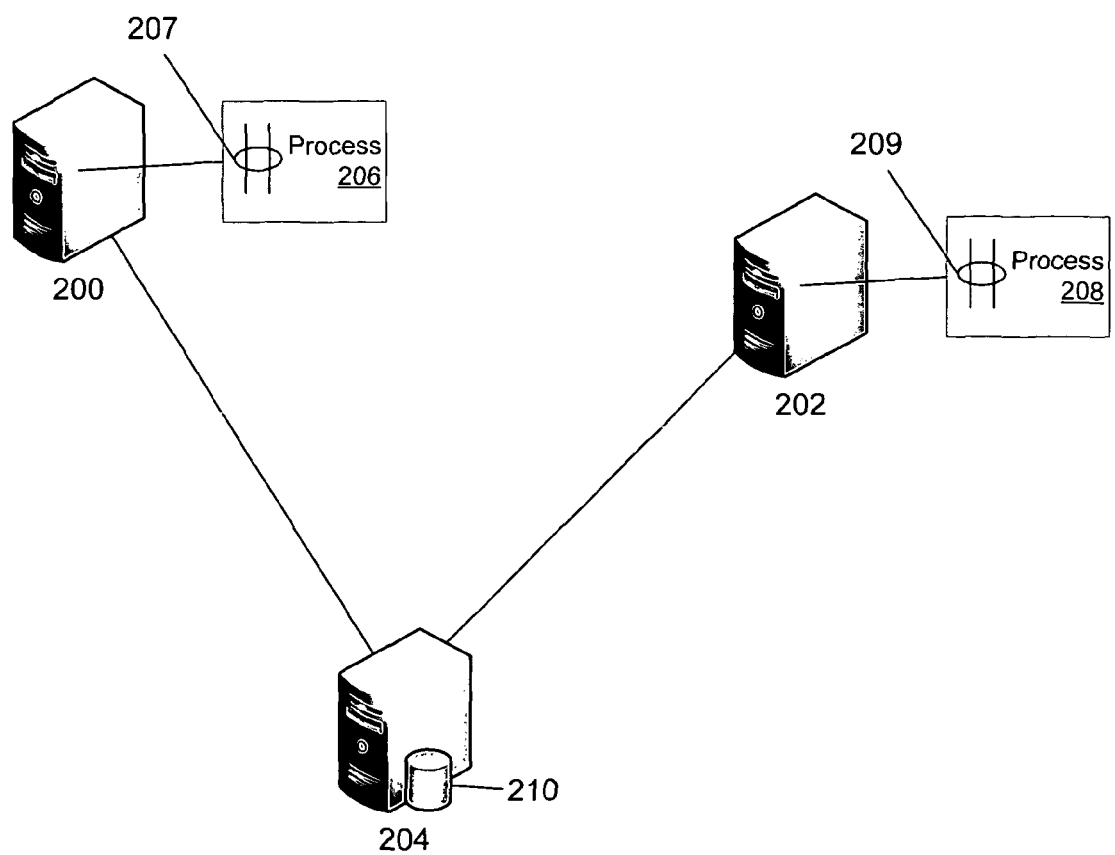
FIG. 2 illustrates a two-node cluster and illustrates a basic implementation of clustering.

FIG. 2 depicts a two-node cluster and illustrates a basic implementation of clustering. On a first server 200, there is a process 207 having services 206. On a second server 202, there is a inactive backup process 209 that will have services 208 if active. The backup process 208 is intended to take over for the process 207, should the process 207 or server 202 fail. Both servers 200 and 204 are connected to a common system 204 having a database 210 (e.g., MICROSOFT SQL SERVER) thereon.

When the process 207 starts, it sends a startup heartbeat to the database 210. The first heartbeat informs the database 210 that the process exists and that it should be monitored. The first heartbeat also informs the database 210 that if the database 210 thought the process was already alive, then it should assume that a failure of the process was not detected. Accordingly, the database 210 releases any resources with the exception of the newly restarted process. The process 207 will then continue to send heartbeats at predetermined intervals to the database 210 to inform the database that the process is still alive. Finally, at shutdown, the process 207 will send a final heartbeat indicating that it is shutting down so that any resources it holds can be released and monitoring can be discontinued.

An exemplary procedure interface for sending heart beats may be:

SendHeartBeat (guid ProcessID, int Command, int Interval), where the ProcessID is a unique identifier for each process, the Command parameter indicates whether this is a startup, normal, or shutdown heartbeat and the Interval indicates how often the heartbeats will come. When the startup heartbeat is sent, an entry in a Process table is made to record the fact that this process exists. The Process table may be as follows:

Process (guid ProcessID, String ApplicationName, Datetime ProcessStartTime, Datetime LastHeartBeat, Datetime NextHeartBeat), where LastHeartBeat and NextHeartBeat columns are updated with every heartbeat. The NextHeartBeat indicates a time after which, if the database has not received a heartbeat, the process is considered to have ceased. It is preferred that this value is calculated by multiplying the interval by 10 and adding it to the last heartbeat. This implies that that if database does not receive 10 heartbeats, the process is deemed to be ceased. A preferred heartbeat interval is 1 minute, hence failover can take over 10 minutes before being detected.

In order to monitor the processes and that the heartbeats are being sent, a Database Agent job 212 may be scheduled to run every minute and check the current time against the NextHeartBeat columns for all processes. For any processes whose next heartbeat timestamp has expired, the job will release all resources associated with that process. The resources may consist of services marked active by those processes and messages associated with those services. The job handles detecting and freeing resources for failed processes.

In another aspect, the present invention frees resources and restarts active instances after the Database Agent job 212 detects a failed process. The Database Agent job 212 will acquire an exclusive lock on the process id to prevent other callers (specifically the actual process) from trying to free the resources for the same process at the same time. It will then iterate over all services currently marked as active by the failed process. It will free those services and then search the event queue for message references also marked as in-process and release those also.

Figure 3:
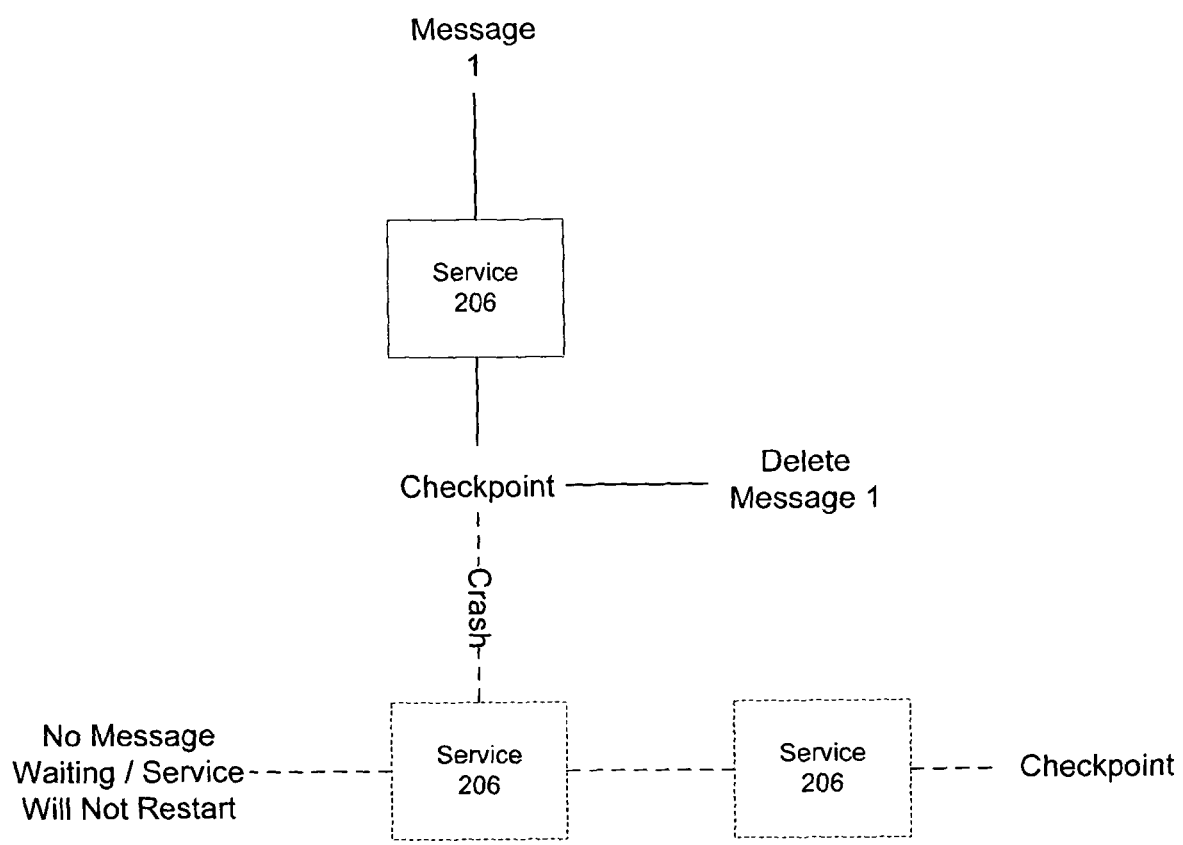
FIG. 3 illustrates a service that will not restart after a failure.
Figure 4:
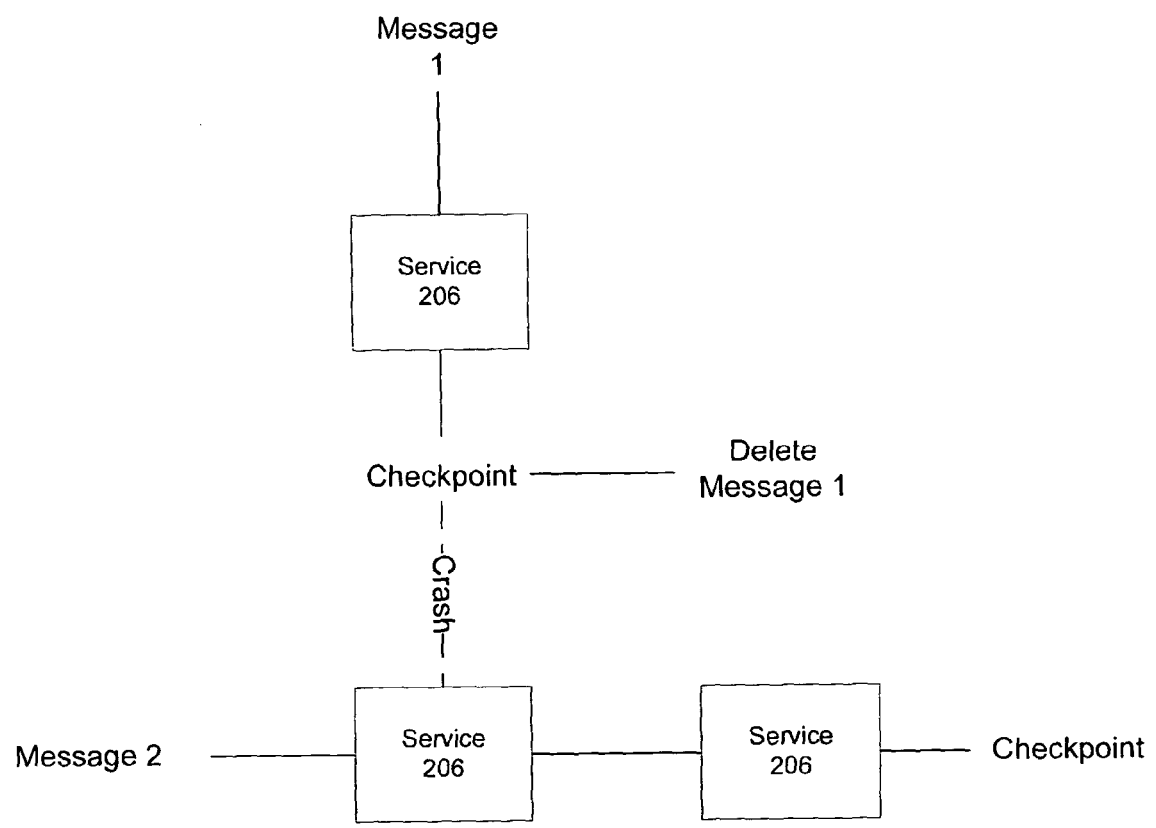
FIG. 4 illustrates a service that will restart after a failure.

Referring now to FIGS. 3 and 4, there may be a problem restarting a service if no messages are found in the event queue which are marked in process. This is because the particular service is not waiting for any messages. FIG. 3 illustrates this in detail, where message 1 is sent to the service 206. If a checkpoint is reached, message 1 is deleted. If there are additional events to be processed, they will not be restarted because there is no pending message for service 206, thus there is nothing to restart the service 206. FIG. 4 illustrates a situation where the service 206 will restart after a crash. Here the difference is that message 2 will be sent to the service 206 after the crash. Upon receipt of message 2, the service 206 will restart.

In the case of FIG. 3, the service is provided a reference to an internal Restart Message with a well known id after a crash if there are no messages in the event queue. The Restart Message is different from a regular business event and it will be internal to the MessageBox and it will have no business content or properties. The Restart Message will be provided similarly as message 2 in FIG. 4, and advantageously allows a potentially blocked service to be restarted. This is because the mechanism for (re)starting a service is message delivery. When a Restart Message is delivered, there will be a property on the message which can be queried and will indicate that it is a restart message.

Thus, the layer which interoperates with the database 210 (in this case the Message Agent), is aware of the well known id of the restart message and detects such messages for instances and marks them as Restart Messages. It is preferable that the calling processes do not need to know the hard-coded id. If the message turns out to be unnecessary as there was an undelivered message or the service was not blocked, the message should simply be ignored by the service.

In some cases, however, a service has resources which are not persistent or the instance does not need to be recovered. This would be the case in, e.g., a stock quote request, where, if the system crashed, the user could just send another request for quote. In those cases, it is preferable to allow the process to indicate when the instance is being created whether it is discardable. A column is added to the instance table indicating whether the service is discardable. This flag is read when performing process recovery, and for any service instance which is marked as discardable, the instance entry information as well as all necessary state information and other artifacts for the service instance would simply be deleted.

In accordance with another feature of the invention, handling of incorrect failure detection is provided to prevent releasing data from a healthy process. To this end, an activation id is stamped on each service instance to prevent this. The activation id is set on the instance (in a column in the instance table) when the instance is locked by a process. Whenever the process returns to do work on the instance (i.e., receive completing a message, adding state, creating subscriptions), the activation id should be passed in and validated against the activation id stamped on the instance table. If the two do not match, then the instance has been released from underneath the process.

The present invention also provides for situations where the process 207 is shutdown in a controlled manner, but the services 206 running in the process are still driving and need to be restarted in the backup process 209. When the process 207 is shutdown, a last known good state is set, and the service 206 then "dehydrates" and is removed from memory on the server 200. The Database Agent job 212 determines if the service 206 can "rehydrate," i.e., is at a blocking state. If not, the service instance is provided a reference to the Restart Message to insure the process will rehydrated upon a restart.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, may be applied to a serialization format other than XML, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of process recovery in a distributed environment, comprising:
   determining a last known good state;
   storing the last known good state in persisted data;
   detecting a process heartbeat associated with a first instance of a process, said process having services;
   determining that said process has failed if said heartbeat was not received at a predetermined next heartbeat time;
   ascertaining if said process was incorrectly determined as failed by comparing an identifier associated with said first instance of said process with an identifier in a database table;
   releasing resources associated with said process; and
   starting a second instance of said process and said services from a last known good state of said first instance of said process.

2. The method of claim 1, further comprising storing information regarding said process heartbeat in a database table; and
   scheduling a database agent job to check a current time against said next heartbeat time.

3. The method of claim 1, said starting said second instance of said process further comprising:
   providing a restart message to restart the said services within said second instance of said process if there are no service messages marked for service within the process.

4. The method of claim 1, said starting said services in the second instance of said process further comprising:
   determining if said service has resources which are not persistent or if said service does not need to be recovered;
   deleting entries in a database table associated with said service; and
   not restarting said service in the second instance of said process.

5. The method of claim 1, further comprising:
   determining if said first instance of said process is being shutdown in a controlled manner;
   determining if said services running in said process are active; and
   removing said process from memory.

6. The method of claim 3, further comprising providing said restart message with no content or properties.

7. The method of claim 5, further comprising:
   determining if said service will start; and
   if not, providing a restart message to said service to start said second instance of said process.

8. A computer readable medium excluding transmission medium having computer-readable instructions stored thereon for process recovery in a distributed environment, said computer-readable instructions performing the method comprising:
   determining a last known good state; storing the last known good state in persisted data;
   detecting a process heartbeat associated with a first instance of a process, said process having services;
   determining that said process has failed if said heartbeat was not received at a predetermined next heartbeat time;
   ascertaining if said process was incorrectly determined as failed by comparing an identifier associated with said first instance of said process with an identifier in a database table;
   releasing resources associated with said process; and
   starting a second instance of said process and said services from a last known good state of said first instance of said process;
   determining if said first instance of said process is being shutdown in a controller manner;
   determining if said services running in said process are active; and removing said process from memory.

9. The computer readable medium of claim 8, further comprising instructions for storing information regarding said process heartbeat in a database table; and
   scheduling a database agent job to check a current time against said next heartbeat time.

10. The computer readable medium of claim 8, said starting said second instance of said process further comprising instructions for:
    providing a restart message to restart said second instance of said process if there are no service messages marked for service within the process.

11. The computer readable medium of claim 8, said starting second instance of said process further comprising instructions for:
    determining if said service has resources which are not persistent or if said process does not need to be recovered;
    deleting entries in a database table associated with said service; and
    not starting the service in the said second instance of said process.

12. The computer readable medium of claim 8, further comprising instructions for:
    providing a restart message to said service to start in said second instance of said process when said service will not start in said first instance of said process.

13. The computer readable medium of claim 10, further comprising instructions for providing said restart message with no content or properties.

14. A system for process recovery in a distributed environment:
    a processor; and
    a memory having stored thereon instructions comprising:
       determining a last known good state;
       storing the last known good state in persisted data;
       detecting a process heartbeat associated with a first instance of a process, said process having services;
       determining that said process has failed if said heartbeat was not received at a predetermined next heartbeat time;
       ascertaining if said process was incorrectly determined as failed by comparing an identifier associated with said first instance of said process with an identifier in a database table;

releasing resources associated with said process;
starting a second instance of said process and said services from a last known good state of said first instance of said process;
determining if said first instance of said process is being shutdown in a controller manner;

determining if said services running in said process are active; and
removing said process from the memory.

* * * * *